(12) United States Patent
Olsson et al.

(10) Patent No.: US 10,299,301 B2
(45) Date of Patent: *May 21, 2019

(54) COMMUNICATION OF INFORMATION BETWEEN DEVICES IN COMMUNICATION NETWORKS

(71) Applicant: TELEFONAKTIEBOLAGET LM ERICSSON (PUBL), Stockholm (SE)

(72) Inventors: Lars-Bertil Olsson, Angered (SE); Lasse Olsson, Stora Höga (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/425,023

(22) Filed: Feb. 6, 2017

(65) Prior Publication Data

US 2017/0150536 A1 May 25, 2017

Related U.S. Application Data

(63) Continuation of application No. 12/595,151, filed as application No. PCT/SE2007/000353 on Apr. 13, 2007, now Pat. No. 9,602,958.

(51) Int. Cl.
*H04W 64/00* (2009.01)
*H04W 76/12* (2018.01)
(Continued)

(52) U.S. Cl.
CPC .............. *H04W 76/12* (2018.02); *H04W 4/02* (2013.01); *H04W 64/00* (2013.01); *H04W 76/22* (2018.02); *H04W 76/32* (2018.02); *H04W 76/10* (2018.02)

(58) Field of Classification Search
CPC . H04W 76/022; H04W 64/00; H04W 76/041; H04W 76/062
See application file for complete search history.

(56) References Cited

U.S. PATENT DOCUMENTS 7,031,700 B1   4/2006   Weaver et al.
7,869,393 B2   1/2011   Maxwell et al.
(Continued)

FOREIGN PATENT DOCUMENTS

EP   1802049 A1   6/2007
GB   2403622 A    1/2005
WO   2005086521 A1   9/2005

OTHER PUBLICATIONS

Digital cellular telecommunications system (Phase 2+); Universal Mobile Telecommunications System (UMTS); General Packet Radio Service (GPRS); Service description; Stage 2 (3GPP TS 23.060 version 6.15.0 Release 6). ETSI TS 123 060 v6.15.0 (Dec. 2006).
(Continued)

*Primary Examiner* — Yemane Mesfin
*Assistant Examiner* — Henry Baron

(57) ABSTRACT

A first node in a connection network and a method for providing said first node with information related to a geographical position of a user terminal, which connection network comprises said first node, a second node and an access network, wherein: the first node has access to at least one user terminal via a wireless interface provided by the access network; and the second node is connected to the first node and has access to at least one external network, which method is characterized by the steps of: sending a session request from the second node to the first node; and sending a session response from the first node to the second node after receiving said session request, which session response comprises information related to a geographical position of the terminal associated with the session in question.

4 Claims, 6 Drawing Sheets

(51) Int. Cl.
*H04W 76/10* (2018.01)
*H04W 4/02* (2018.01)
*H04W 76/22* (2018.01)
*H04W 76/32* (2018.01)

(56) References Cited

U.S. PATENT DOCUMENTS

| | | | | |
|---|---|---|---|---|
| 2004/0225534 | A1* | 11/2004 | Zheng | G06Q 40/08 |
| | | | | 705/4 |
| 2005/0186970 | A1* | 8/2005 | Yates | H04W 4/10 |
| | | | | 455/456.5 |
| 2005/0195792 | A1 | 9/2005 | Bak | |
| 2006/0252438 | A1* | 11/2006 | Ansamaa | H04W 4/02 |
| | | | | 455/503 |
| 2010/0093346 | A1* | 4/2010 | Song | H04L 41/12 |
| | | | | 455/435.1 |

OTHER PUBLICATIONS

ETSI TS 123 271 V6.13.0 (Sep. 2005) Digital cellular telecommunications system (Phase 2+); Universal Mobile Telecommunications System (UMTS); Functional stage 2 description of Location Services (LCS) (3GPP TS 23.271 version6.13.0 Release 6), PUB: ETSI Standards, European Telecommunications Standards Institute, Sophia-Antipo, FR. PO: 2005-09-00.

ETSI TS 182 009 V0.0.13 (Jun. 2006) Telecommunications and Internet converged Services and Protocols for Advanced Networking (TISPAN); NGN Architecture to support emergency communication from citizen to authority; PUB: ETSI Standards, European Telecommunications Standards Institute, Sophia-Antipo, FR;PD:2006-06-00.

* cited by examiner

COMMUNICATION OF INFORMATION BETWEEN DEVICES IN COMMUNICATION NETWORKS

RELATED APPLICATIONS

This application is a continuation of co-pending U.S. patent application Ser. No. 12/595,151 filed Oct. 8, 2009, which was the National Stage of International Application No. PCT/SE2007/000353, filed Apr. 13, 2007, the disclosures of which are incorporated herein by reference in their entireties.

TECHNICAL FIELD

The present invention is directed to communication of information between devices in communication networks. Particular aspects of the invention are directed to time correlated communication of information between devices in communication networks and particularly between devices in telecommunication networks.

BACKGROUND OF THE INVENTION

Over the years there has been an ever increasing development of different communication networks covering a vast spectrum of areas such as e.g. computer networks and telecommunication networks etc.

Communication networks may be of different scale such as e.g. Personal Area Network (PAN), Local Area Network (LAN), Campus Area Network (CAN), Metropolitan Area Network (MAN) or Wide Area Network (WAN) etc. In addition, communication networks may support and/or utilize one or several different functional relationships such as e.g. Client-Server relations and/or Peer-to-Peer relations etc. Furthermore, communication networks are usually based on one or several different topologies such as e.g. bus-networks, star-networks, ring-networks, mesh-networks, star-bus networks and/or tree topology networks etc. Similarly, communication networks may be based on wired communication and/or wireless communication. It should be emphasized that there may be no clear boundaries between different communication networks. The networks may e.g. be mixed and/or connected to each other.

Suppliers and operators of modern communication networks have become increasingly aware of the importance of communicating information between different networks. In this connection, suppliers and operators have become particularly aware of the importance of communicating information between devices which interfaces an access network with a communication network and devices which interfaces the communication network with another communication network.

A typical example is the so-called General Packet Radio Service systems (GPRS systems) defined in the standard specifications released by the 3$^{rd}$ Generation Partnership Project (3GPP), see e.g. www.3gpp.org. Here, special interest has been directed to the communication of information between the Serving GPRS Support Node (SGSN) which interfaces the Radio Access Network (RAN) with the Core Network (CN) and the Gateway GPRS Support Node (GGSN) which interfaces the CN with a Public Data Network (PDN).

The 3GPP standard defines how information is exchanged between the SGSN and GGSN at the Gn interface using the GTP protocol, see e.g. the technical specifications TS 23.060 "General Packet Radio Service (GPRS); Service Description; Stage 2" and TS 29.060 "General Packet Radio Service (GPRS), GPRS Tunnelling Protocol (GTP) across the Gn and Gp interface", incorporated herein by reference.

Amongst other things the above specifications defines that the information elements MS Time Zone (MTZ) and User Location Information (ULI) may be supplied by the SGSN to GGSN as part of the four messages 1-4 below:

1) A Create PDP Context Request message sent by the SGSN,
2) An SGSN-initiated Update PDP Context Request message sent by the SGSN,
3) A Create MBMS Context Request message sent by the SGSN, or
4) An Update MBMS Context Request message sent by the SGSN.

As is well known to those skilled in the art the information element MTZ comprises information about the offset between universal time and local time where the cell phone in question currently resides. Similarly, as is well known, the information element ULI comprises information about the relevant geographic location in which the cell phone in question currently resides. An ULI may e.g. comprise the Service Area Identifier (SAI), which is used to identify an area consisting of one or more cells belonging to the same Location Area. The Service Area can e.g. be used for indicating the location of a UE (cell phone) to the CN (Core Net). This is e.g. described in the 3GPP TS 25413-750 specification. An ULI may also comprise the Cell Global Identification (CGI), which is the concatenation of the Location Area Identification and the Cell Identity. A Cell Identity is typically unique within a Location Area. The CGI can e.g. be used for indicating the location of a UE (cell phone) to the CN (Core Net). This is e.g. described in the 3GPP TS 23003-730 specification.

It should also be clarified that the PDP context (Packet Data Protocol context) can be perceived as a data structure present on both the SGSN and the GGSN which contains the session information of a subscriber when the subscriber has an active session. When a cell phone wants to use functions in a GPRS, it must first attach and then activate a PDP context, which i.a. results in a Create PDP Context Request message sent by the SGSN to the GGSN. This allocates a PDP context data structure in the SGSN which the subscriber is currently visiting and in the GGSN serving the subscribers access point. Similarly, a MBMS context is a data structure present on both the SGSN and the GGSN which contains the session information of a subscriber when the subscriber has an active multicast session using a general purpose PDP context. This is all well known to those skilled in the art.

The observant reader realizes that the four messages 1-4 mentioned above are sent for other reasons than a change in information that is related to the geographical position of the cell phone, and particularly for other reasons than a change of the value for the two information elements MTZ and ULI, i.e. for other reasons than a change in e.g. the relevant time zone or the relevant geographical location for the cell phone in question.

The benefit is that the overall signaling frequency is unaffected by a change of value in the two information elements MTZ and ULI. However, the downside is that the GGSN is not always updated with correct values of the MTZ and ULI since the two information elements are supplied to the GGSN at times that are non-correlated to the time when the information elements change values.

In the light of the above, there seems to be a need for improvements with respect to the communication of information between a SGSN which interfaces the RAN with the CN and a GGSN which interfaces the CN with a PDN. There seems to be a particular need for an improved correlation of changes in the information related to the position of a cell phone and the communication of these changes between the SGSN and the GGSN, which improvement has no or substantially no effect on the overall signaling frequency.

More generally, there seems to be a need for improvements with respect to the communication of information between a first device which interfaces an access network with a connection network and a second device which interfaces the connection network an external network. There seems to be a particular need for an improved correlation of changes in the information related to the geographical position of a wireless terminal or similar and the communication of these changes between said first and the second device, which improvement has no or substantially no effect on the overall signaling frequency.

SUMMARY OF THE INVENTION

The present invention is directed to solving the problem of providing improvements with respect to the communication of information between a first device which interfaces an access network with a connection network and a second device which interfaces the connection network with an external network. In particular, the present invention is directed to solve the problem of providing an improved correlation of changes related to the geographical position of a wireless terminal or similar and the communication of these changes between said first and second device, which improvement has no or substantially no effect on the overall signaling frequency.

One object of the present invention is thus to provide improvements with respect to the communication of information between a first device which interfaces an access network with a connection network and a second device which interfaces the connection network with an external network. In particular, an object of the present invention is to provide an improved correlation of changes related to the geographical position of a wireless terminal or similar and the communication of these changes between said first and second device, which improvement has no or substantially no effect on the overall signaling frequency.

The object mentioned above is accomplished by a first aspect of the present invention providing A first node in a connection network, which connection network comprises said first node, a second node and an access network, wherein: the first node is arranged to be operatively connected to at least one user terminal via a wireless interface being operatively provided by the access network; and the second node is arranged to be operatively connected to the first node and to at least one external network, so as to operatively provide a session between said user terminal and said external network, The first node is characterized in that it is arranged to operatively send a session response to the second node when receiving a session request from the second node, which session response comprises information related to a geographical position of the user terminal associated with the session in question.

It should be emphasized that it is preferred that the above mentioned messages "session request" and "session response" are related to the character of a session, e.g. related to the creation of a session, update of a session and/or the deletion of a session etc. Messages related to the character of a session are preferably fully or at least mainly communicated for other reasons than changes in any information related to the geographical position of a user terminal associated with the session in question. Hence, the overall signaling frequency when communicating messages related to the character of a session is preferably fully or at least mainly unaffected by changes in any information related to the position of the user terminal associated with the session in question. In addition, providing information from the first node to the second node regarding the position of a terminal as a response to a request from the second node as defined above provides a more frequent updating of the second node compared to known solutions.

A second aspect of the invention is directed to a node including the features of the first aspect and characterized in that it is arranged to operatively send a create session response to the second node when receiving a create session request from the second node, which create session response comprises information related to a geographical position of the user terminal associated with the session in question.

A third aspect of the invention is directed to a node including the features of the first aspect and characterized in that it is arranged to operatively send an update session response to the second node when receiving an update session request from the second node, which update session response comprises information related to a geographical position of the user terminal associated with the session in question.

A fourth aspect of the invention is directed to a node including the features of the first aspect and characterized in that it is arranged to operatively send a delete session response to the second node when receiving a delete session request from the second node, which delete session response comprises information related to a geographical position of the user terminal associated with the session in question.

A fifth aspect of the invention is directed to a node including the features of any of the first, second, third, or fourth aspect and characterized in that it is arranged to operatively create a session for a terminal by sending a create session request to the second node, which create session request comprises information related to the a geographical position of the user terminal associated with the session in question.

A sixth aspect of the invention is directed to a node including the features of any of the first, second, third, fourth or fifth aspect characterized in that it is arranged to operatively update a session for a terminal by sending an update session request to the second node, which update session request comprises information related to the geographical position of the user terminal associated with the session.

A seventh aspect of the invention is directed to a node including the features of the first aspect and characterized in that it is a Serving GPRS Support Node (SGSN) arranged to be operatively connected to a second node in the form of a Gateway GPRS Support Node (GGSN).

The object mentioned above is also accomplished by an eight aspect of the present invention providing a method for providing a first node in a connection network with information related to a geographical position of a user terminal, which connection network comprises said first node, a second node and an access network, wherein: the first node has access to at least one user terminal via a wireless interface provided by the access network; and the second node is connected to the first node and has access to at least one external network.

The method is characterized by the steps of:
  sending a session request from the second node to the first node; and sending a session response from the first node to the second node after receiving said session request, which session response comprises information related to a geographical position of the terminal associated with the session in question.

A ninth aspect of the invention is directed to a method including the features of the eight aspect and characterized by the steps of:

sending a create session request from the second node to the first node; and sending a create session response from the first node to the second node after receiving said create session request, which create session response comprises information related to a geographical position of the terminal associated with the session in question.

A tenth aspect of the invention is directed to a method including the features of the eight or ninth aspect and characterized by the steps of:

sending an update session request from the second node to the first node; and sending an update session response to the second node from the first node after receiving said update session request, which update session response comprises information related to a geographical position of the terminal associated with the session in question.

An eleventh aspect of the invention is directed to a method including the features of the eight, ninth or tenth aspect and characterized by the steps of:

sending a delete session request from the second node to the first node; and sending a delete session response from the first node to the second node after receiving said delete session request, which delete session response comprises information related to a geographical position of the terminal associated with the session in question.

An eleventh aspect of the invention is directed to a method including the features of the eight, ninth, tenth or eleventh aspect and characterized in that said first node is a Serving GPRS Support Node (SGSN) and said second node is a Gateway GPRS Support Node (GGSN), which nodes are connected to each other.

Further advantages of the present invention and embodiments thereof will appear from the following detailed description of the invention.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasised that the methods defined by the appended claims may comprise further steps in addition to those mentioned therein. Moreover, without departing from the present invention, the steps in the claims may be performed in another order than the order in which they are presented in the claims.

DETAILED DESCRIPTION OF PREFERRED EMBODIMENTS

Structure of Preferred Embodiments

A First Exemplifying Network System

Figure 1:
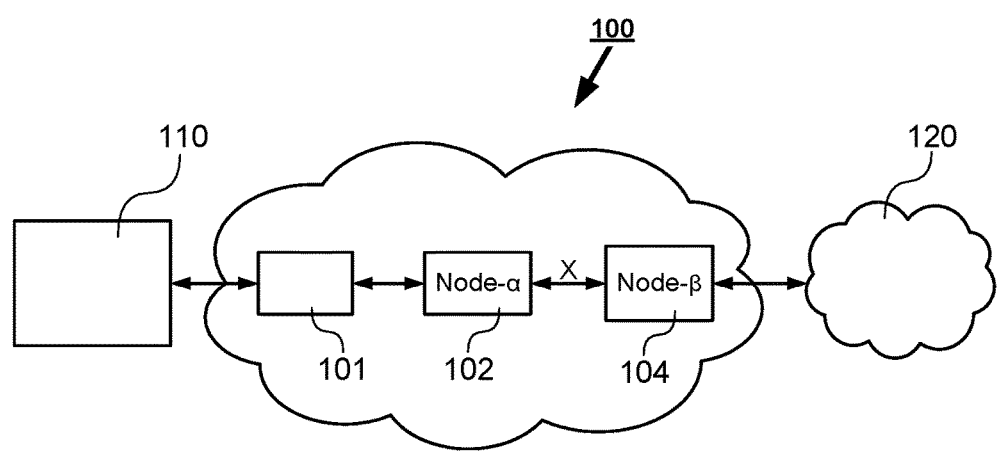
FIG. 1 is a schematic illustration of a first exemplifying communication network

FIG. 1 illustrates a communication network system according to a first exemplifying embodiment of the present invention. The exemplifying network system in FIG. 1 comprises one or several terminals 110, a connection communication network 100 and an external communication network 120.

The terminal 110 in the exemplifying communication network system in FIG. 1 is preferably a cell phone or similar, or a computer or a computer system or similar being arranged to operatively establish a wireless communication with the connection network 100, as will be described in some detail below. It should be added that the terminal 110 may comprise a GPS receiver for retrieving information of its current geographical location, which in turn may be communicated to the connection network 100, e.g. to a Node-α 102 or Node-β 104.

The connection network 100 is arranged to operatively connect the terminal 110 to the external network 120, e.g. to a server connected to the external network 120. It is preferred that at least parts of the connection network 100 is a packet switched network being arranged to operatively communicate packet data between the terminal 110 and the external network 120. However, other means for communicating are clearly conceivable, e.g. a circuit switched connection. The connection network 100 may e.g. be a cellular telecommunication network or a similar wireless network, e.g. a network based on HIPERMAN, iBurst, WiMAX, WiBro or WiFi technology or similar or any suitable combination of the networks now mentioned.

As can be seen in FIG. 1, the exemplifying connection network 100 comprises an Access Network, preferably a Radio Access Network (RAN) 101, though other access networks may be conceivable. In addition, the connection network 100 comprises a Node-α 102 and a Node-β 104.

The RAN 101 in the connection network 100 is arranged to operatively provide a wireless interface between the connection network 100 and the wireless terminal 110 via an air interface. This can be achieved in various manners as is well known to those skilled in the art. This has also been implemented in various manners in the exemplifying wireless networks mentioned above.

It should be added that the RAN 101 may be arranged so as to be able to perform an triangulation or similar to obtain information of the current geographical location of a certain terminal, which information in turn may be communicated to the connection network 100, e.g. to a Node-α 102 or Node-β 104.

Node-α 102 is arranged to interface the RAN 101 with the central parts and functions of the connection network 100, whereas Node-β 104 is arranged to interface the connection network 100 with external networks as indicated by the network 120 in FIG. 1. In turn, Node-α 102 and Node-β 104 are connected to each other via a suitable interface. This interface has been denoted X in FIG. 1. It should be emphasized that Node-α 102 and Node-β 104 may be fully or partly arranged in the same physical unit and/or as spatially separated equipments, e.g. equipments arranged at different geographical locations.

Connection networks comprising an access network for interfacing the connection network with wireless terminals, a first node for interfacing the access network with the central parts and functions of the connection network and a second node for interfacing the connection network with external networks are well known to those skilled in the art and they need no further description. A specific example of such a network will be discussed in more detail later in connection with the description of an exemplifying GPRS network.

The external network 120 shown in FIG. 1 may be the Internet or a similar communication network. The Internet can be perceived as a collection of interconnected computers and computer networks or similar being linked by copper wires, fiber-optic cables, wireless connections etc. The devices in such networks are typically communicating by means of an IP (Internet Protocol) and a TCP (Transmission Control Protocol) as is well known in the art. As an alternative and/or possibly as a complement to the TCP some networks may use the User Datagram Protocol (UDP) or the Stream Control Transmission Protocol (SCTP) or some other similar protocol that is likewise well known in the art. However, even if packet switched networks as the Internet and similar are preferred it should be emphasized that other communication networks are clearly conceivable.

A Second Exemplifying Network System

Figure 2:
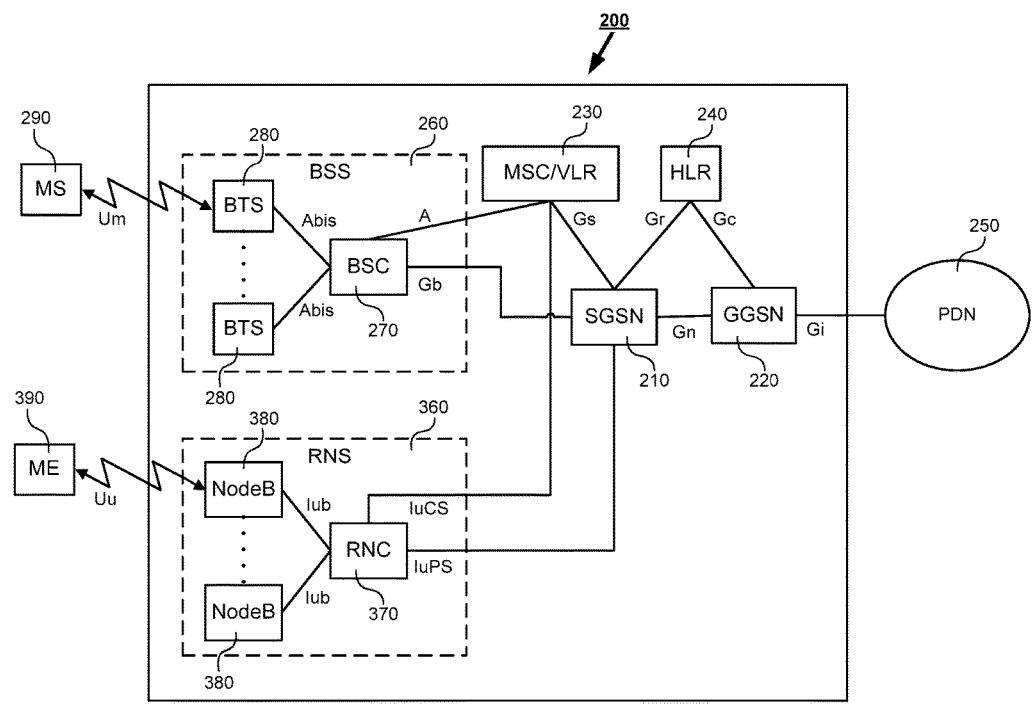
FIG. 2 is a schematic illustration of a second exemplifying communication network

The attention is now directed to a second exemplifying communication network 200 according to an embodiment of the invention as illustrated in FIG. 2. In fact, FIG. 2 is a schematic overview of an exemplifying telecommunication network in the form of a General Packet Radio Service system (GPRS system) in which various network elements and interfaces are shown. The structure and operation of a general GPRS system is well known by those skilled in the art and it needs no detailed explanation. As already indicated above, more information about GPRS systems and similar systems as the UMTS can e.g. be found in the specifications released by the 3$^{rd}$ Generation Partnership Project (3GPP), se e.g. www.3gpp.org. However, a brief overview of an exemplifying GPRS network is given below. Before we proceed it should be emphasized that the invention is by no way limited to a GRPS network or similar. On the contrary, the invention can be implemented in most telecommunication systems of today, e.g. such as GSM, EDGE, CDMA, WCDMA and the HSDPA and similar.

The main Core Network (CN) elements in the GPRS network 200 are the Serving GPRS Support Node (SGSN) 210, the Gateway GPRS Support Node (GGSN) 220, and upgraded location registers such as the Visitor Location Register (VLR) 230 and the Home Location Register (HLR) 240. A SGSN 210 and a GGSN 220 may be connected directly and/or through intermediate routers and switches to form parts of the CN. In addition, it should be emphasized that a SGSN 210 and a GSGSN 220 may be fully or partly arranged in the same physical unit and/or as spatially separated equipments, e.g. equipments arranged at different geographical locations. The CN is used as the interface between a Radio Access Network (RAN)—as will be elaborated below—and various external data networks such as e.g. a Public Data Network (PDN) 250 as shown in FIG. 2. The Internet is a well known and common example of a PDN.

The GGSN 220 operates as an interface between the CN and the various PDNs through the GPRS Gi-interface. At the other end the SGSN 210 operates as an interface between various RANs.

If the RAN is a GSM EDGE Radio Access Network (GERAN) the SGSN 210 interfaces through the GPRS Gb-interface. Typically, the GERAN comprises one or several Base station Sub-Systems (BSS) 260, which in turn comprises one or several Base Station Controllers (BSC) 270 at one end being connected to the SGSN 210 via said Gb-interface, and at the other end connected to a plurality of Base Transmission Stations (BTS) 280 via a GPRS Abis-interface. A BTS is in turn serving one or several Mobile Stations (MS) 290 via a GPRS Um-interface, which is an air interface.

If the RAN is a Universal Terrestrial Radio Access Network (UTRAN) the SGSN 210 interfaces through the GPRS IuPS-interface. Typically, the UTRAN comprises one or several Radio Network Systems (RNS) 360, which in turn comprises one or several Radio Network Controllers (RNC) 370 at one end being connected to the SGSN 210 via said IuPS-interface, and at the other end connected to a plurality of NodeBs 380 via a GPRS Iub-interface. Each NodeB is in turn serving one or several Mobile Equipments (ME) 390 via a GPRS Um-interface, which is an air interface.

The SGSN 210 maintains signaling connections with the HLR 240 and a Mobile Switching Centre (MSC) and the VLR 230 through the GPRS Gs-interface and the GPRS Gr-interface respectively. The GGSN 220 maintains signaling connections with the HLR 240 through the GPRS Gc-interface. A BSC 270 maintains signaling with the MSCA/LR 230 through the GPRS A-interface, whereas a RNC maintains signaling with the MSCA/LR 230 through the GPRS IuCS-interface. The interconnection between the SGSN 210 and GGSN 220 are implemented through the GPRS Gn-interface.

The CN in GPRS can e.g. use the Internet Protocol (IP) as the protocol in the network layer. The protocols used in the transport layer can e.g. be the Internet User Datagram Protocol (UDP) for IP services and the Internet Transmission Control Protocol (TCP) for services which require delivery guarantee such as X.25 services.

The above description of the exemplifying GPRS network 200 corresponds in general to the 3GPP standard and particularly to the specifications in the 3GPP 28-series and 48-series regarding Signal Protocols RSS-CN.

Function of Preferred Embodiments

The First Exemplifying Network
Establishing a Session in the 1$^{st}$ Exemplifying Network—Node-α0 to Node-β

Figure 3:
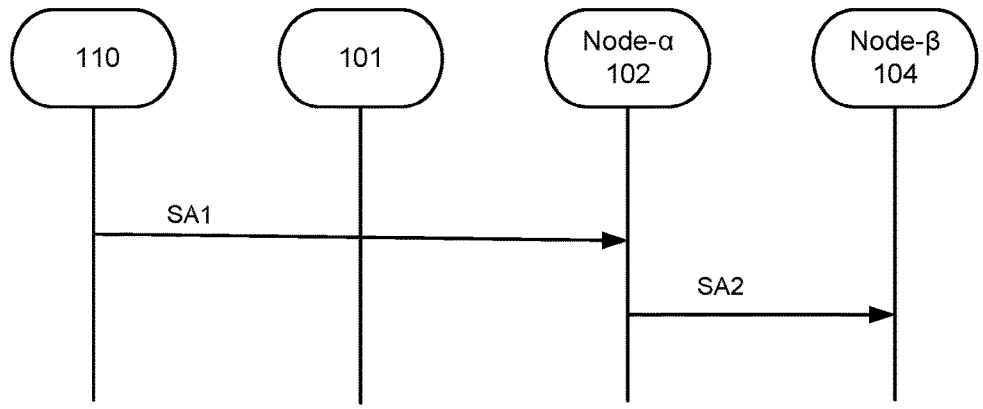
FIG. 3 is a schematic illustration of a first use-case.

FIG. 3 is an exemplifying use-case illustrating how a terminal 110 or similar may activate a session in Node-α 102 and Node-β 104 of the connection network 120 shown in FIG. 1.

In a first step SA1 of the use-case in FIG. 3 it is preferred that a terminal 110 starts a new session or similar by sending an Activate Session Request message or similar to Node-α 102 via the RAN 101 or similar. The Activate Session Request message may e.g. contain such information as the identity of the activating terminal 110 etc.

In a second step SA2 it is preferred that Node-α 102 validates the Activate Session Request using the information provided by the activating terminal 110. If the request is accepted it is preferred that Node-α 102 sends a Create Session Request message to Node-β 104. The Create Session Request message may e.g. comprise such information as the identity of the activating terminal 110 etc. In addition, the Create Session Request message may comprise information related to the position of the terminal 110.

Node-β 104 may return a response message to Node-α 102, which in turn may return a response message to the activating terminal 110 or similar.

Update a Session in the 1st Exemplifying Network—Node-α to Node-β

Figure 4:
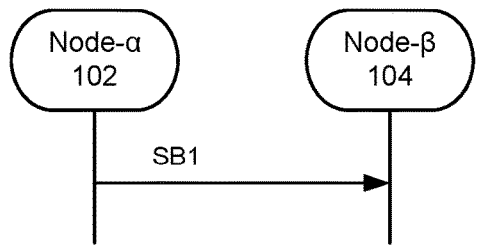
FIG. 4 is a schematic illustration of a second use-case.

FIG. 4 is an exemplifying use-case illustrating how a Node-α 102 or similar may initiate an update of the session established in Node-α 102 and Node-β 104 of the connecting network 100 shown in FIG. 1. For example, an update of the session may be needed if the Quality of Service (QoS) becomes downgraded, which e.g. may happen if the wireless air interface connecting the terminal 110 to the RAN 101 becomes affected by interferences.

In a first step SB1 of the use-case in FIG. 4 it is preferred that Node-α 102 sends an Update Session Request message to Node-β 104. The Update Session Request message may e.g. comprise such information as a new QoS. In addition, the Update Session Request message may comprise information related to the position of the terminal 110.

Node-β 104 may return a response message to Node-α 102, which in turn may return a response message to the activating terminal 110 or similar.

To summarize, establishing a session as described above by sending a Create Session Request message or similar from Node-α 102 to Node-β 104 and updating the session by sending an Update Session Request from Node-α 102 to Node-β 104 may comprise information related to the position of the terminal 110 in question.

However, the messages sent from Node-α 102 to Node-β 104 when creating a session and when updating the session are sent for other reasons than changes in the information related to the position of the terminal 110 or similar. Hence, Node-β 104 will not always be updated with correct information with respect to the position of the terminal 110, since the position information is supplied to Node-β 104 at times that are non-correlated to the time when the position information change values. The described mechanism is further degraded as the position information is only transferred from Node-α 102 to Node-β 104 by an initiative taken by Node-α 102.

The below describes a more frequent updating of Node-β 104 with respect to information that is related to the geographical position of a specific terminal 110 or similar. The updating is particularly advantageous since it has no or substantially no effect on the overall signaling frequency. In addition, the updating may be performed by initiative taken by Node-β 104 itself.

Establishing a Session in the 1$^{st}$ Exemplifying—External Network to Node-β and Node-α

Figure 5:
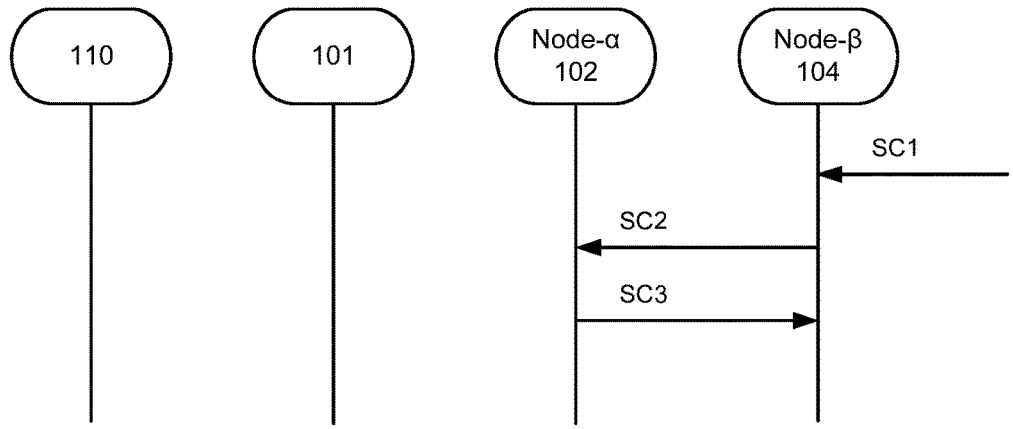
FIG. 5 is a schematic illustration of a third use-case.

FIG. 5 is an exemplifying use-case illustrating how Node-α or similar—upon request of an external network as e.g. the network 120 in FIG. 1 or similar, or a node or terminal or similar therein—may activate a session in Node-α 102 and Node-β 104 of the connecting network 100 in FIG. 1 according to an embodiment of the present invention.

In a first step SC1 of the use-case in FIG. 5 it is preferred that the external network 120 or a node therein or similar transmits a Network Session Request message to Node-β 104, whereupon it is preferred that Node-β 104 determines whether a session should be established.

In a second step SC2 it is preferred that Node-β 104 sends a Create Session Request message to Node-α 102. The Create Session Request message may e.g. comprise such information as the identity of the terminal 110 that the external network 120 or similar may be addressing in the first step SC1.

In a third step SC3, it is preferred that Node-α 102 returns a Create Session Response message or similar to Node-α 102, e.g. in order to acknowledge that it shall request the addressed terminal 110 or similar to activate the requested session or similar. In addition, it is preferred that the Session Response message comprises information related to the position of the terminal 110. Node-α 102 may then instruct the terminal 110 via the RAN 101 to create a new session.

The above may be summarized in that Node-β 104 can be provided with information related to the position of a terminal 110 or similar, which information is sent from the Node-β 104 in connection with the establishing of a session, which establishing is initiated by the Node-β 104 upon request from an external network, e.g. such as the network 120 described above with reference to FIG. 1.

Update a Session in the 1st Exemplifying Network—Node-β to Node-α

Figure 6:
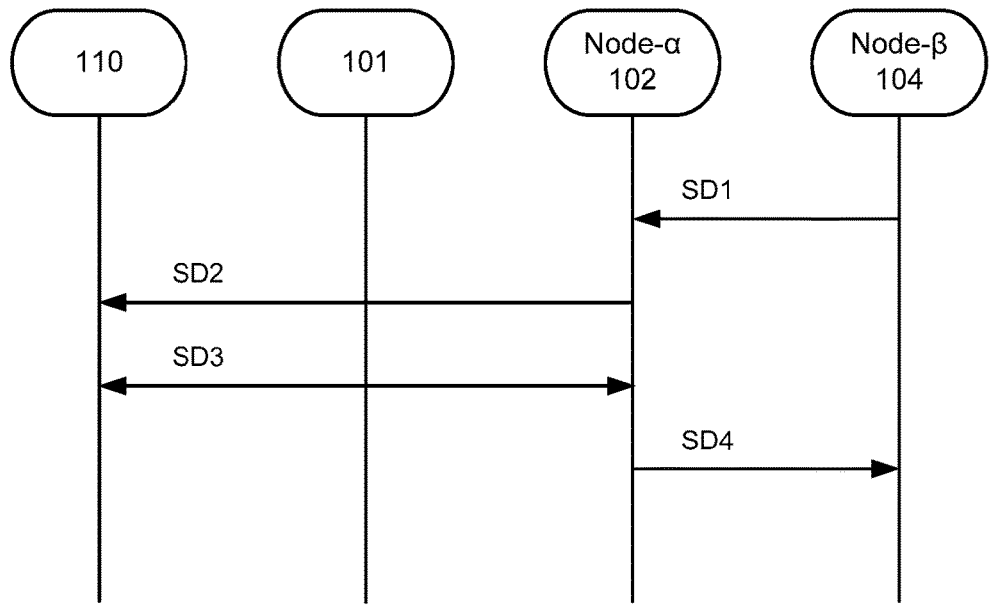
FIG. 6 is a schematic illustration of a fourth use-case.

FIG. 6 is an exemplifying use-case illustrating how a Node-α 102 or similar may initiate an update of a session in Node-α 102 and Node-β 104 of the connecting network 100 in FIG. 1.

In a first step SD1 of the use-case in FIG. 6 it is preferred that Node-β 104 sends an Update Session Request message or similar to Node-α 102. The Update Session Request message may e.g. comprise the identity of the terminal 110 in question.

In a second step SD2 it is preferred that Node-α 102 sends a Modify Session Request message to the terminal 110 in question. The Modify Session Request message may e.g. comprise such information as a new QoS.

In a third step SD3 it is preferred that the terminal 110 accepts the session modification originally requested by Node-β 104 and returns a Modify Session Accept message to Node-α 102 if the modification is successful.

In a fourth step SD4 it is preferred that Node-α 102 returns an Update Session Response message to the SGSN 210. The update PDP Context Response message may e.g. comprise such information as the new QoS. In addition, it is preferred that the Network Notification Response message comprises information related to the position of the terminal 110.

It should be emphasized that step SD4 may be performed before the steps SD2 and/or SD3.

The above may be summarized in that Node-β 104 can be provided with information related to the position of a terminal 110 or similar, which information is sent from Node-α 102 in connection with an update of a session, which update is initiated by Node-β 104.

Deactivating a Session in the 1st Exemplifying Network—Node-β to Node-α

Figure 7:
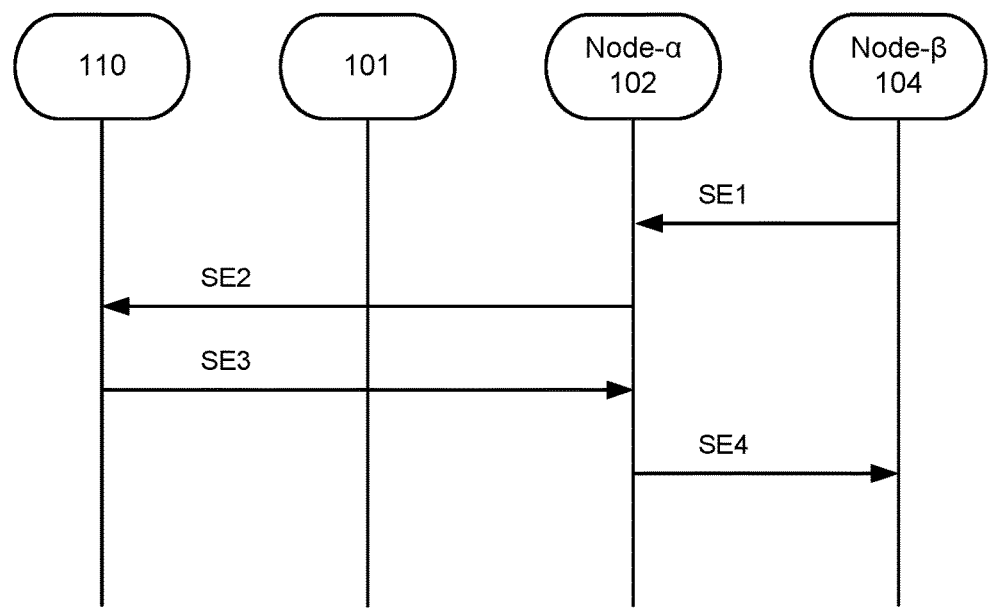
FIG. 7 is a schematic illustration of a fifth use-case.

FIG. 7 is an exemplifying use-case illustrating how a Node-β 104 or similar may initiate a deactivation of a Session in Node-α and Node-β of the connecting network 100 shown in FIG. 1. Providing Node-β with information related to the position of a terminal 110 or similar when the session is deactivated may seem irrelevant. However, a terminal 110 or similar may have several sessions or similar activated simultaneously. It follows that the deactivation of a single session does not necessary end all sessions between the terminal 110 and the connecting network 100 as shown in FIG. 1, since one or more sessions may still be active. Hence, providing Node-β with information related to the position of a terminal 110 or similar when a session is deactivated it is a relevant scenario, at least when the terminal 110 keeps at least one session active after the requested deactivation is processed.

In a first step SE1 of the use-case in FIG. 7 it is preferred that Node-β 104 sends a Delete Session Request message or similar to Node-α. The Delete Session Request message may e.g. comprise such information as e.g. the identity of the terminal 110 which session or sessions is/are to be deleted.

In a second step SE2 it is preferred that Node-α sends a Deactivate Session Request message to the terminal 110. The Deactivate Session Request message may e.g. comprise such information as the nature and/or extent of the deactivation.

In a third step SE3 it is preferred that the terminal 110 removes the session and returns a Deactivate Session Accept message to Node-α.

In a fourth step SE4 it is preferred that Node-α returns a Delete Session Response message or similar to Node-β 104. The Delete Session Response message may e.g. comprise such information as the success or failure of the deletion. In addition, it is preferred that the Delete Session Response message comprises information related to the position of the terminal 110.

It should be emphasized that step SE4 may be performed before the steps SE2 and/or SE3.

The above may be summarized in that Node-β 104 can be provided with information related to the position of a terminal 110 or similar, which information is sent from Node-α 102 in connection with the termination of a session, which termination is initiated by Node-β 104.

The Second Exemplifying Network

Establishing a Session in the $2^{nd}$ Exemplifying Network—SGSN to GGSN

Figure 8:
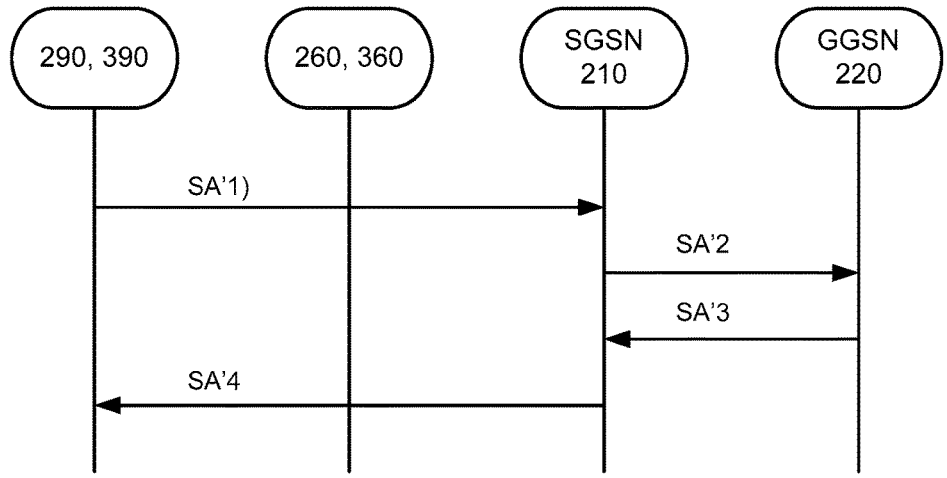
FIG. 8 is a schematic illustration of a sixth use-case.

FIG. 8 is an exemplifying use-case illustrating how a cell phone 290, 390 or similar may activate a PDP context in the SGSN 210 and GGSN 220 of the GPRS network 200 shown in FIG. 2. The activation of a PDP context can be perceived as a part of the establishing of a session between the cell phone 290, 390 and the GPRS network 200. Before we proceed it should be emphasized that the cell phone 290, 390 may e.g. be either an MS 290 or similar, or an ME 390 or similar as indicated in FIG. 2.

In a first step SA'1 of the use-case in FIG. 8, which may be the same or similar as the step SA1 described above, it is preferred that an attached cell pone 290, 390 starts a new session or similar by sending an Activate PDP Context Request message to the SGSN 210 via the RAN 260, 360 or similar. The Activate PDP Context Request message may e.g. contain such information as the Network layer Service Access Point Identifier (NSAPI), Packet Data Protocol Type (PDP Type), Packet Data Protocol Address (PDP Address), Access Point Name, QoS Requested, Protocol Configuration Options, Network Request Support (NRS), Bearer Control Mode (BCM) etc.

In a second step SA'2, which may be the same or similar as the step SA2 described above, it is preferred that the SGSN 210 validates the Activate PDP Context Request using PDP Type (optional), PDP Address (optional), and Access Point Name (optional) provided by the cell phone 290, 390 and the PDP context subscription records. If no GGSN address can be derived or if the SGSN 210 has determined that the Activate PDP Context Request is not valid, the SGSN 210 rejects the PDP context activation request. However, if a GGSN address can be derived, the SGSN 210 creates a Tunnel Endpoint Identifier (TEID) for the requested PDP context and sends a Create PDP Context Request message to the affected GGSN 220. The Create PDP Context Request message may e.g. comprise such information as the PDP Type, PDP Address, Access Point Name, QoS Negotiated, TEID, NSAPI, MSISDN, Selection Mode, Charging Characteristics, Trace Reference, Trace Type, Trigger Id, OMC Identity, Protocol Configuration Options, serving network identity, Maximum APN Restriction IMEISV, CGI/SAI, RAT type, S-CDR CAMEL information, CGI/SAI/RAI change support indication, NRS, BCM.

In this connection it is particularly preferred that—as is clearly provided for in e.g. the 3GPP specifications—that the Create PDP Context Request message comprises the information elements MS Time Zone (MTZ) and User Location Information (ULI) as briefly mentioned above in the section describing the background of the invention. In other words, it is preferred that the Create PDP Context Request message comprises information related to the position of the cell phone in question or similar.

In a third step SA'3, which may be the same or similar as the step SA3 described above, it is preferred that the GGSN 220 creates a new entry in its PDP context table. The new entry allows the GGSN 220 to route PDP PDUs (Packet Data Protocol, Protocol Data Units) between the SGSN 210 and the PDN 250. The GGSN 220 then returns a Create PDP Context Response message to the SGSN 210. The Create PDP Context Response message may e.g. comprise such information as the TEID, PDP Address, Protocol Configuration Options, QoS Negotiated, Charging Id, Prohibit Payload Compression, APN Restriction, Cause, CGI/SAI/RAI change report required, BCM.

In a fourth SA'4 step, which may be the same or similar as the step SA4 described above, it is preferred that the SGSN 210 inserts the NSAPI along with the GGSN address in its PDP context. The SGSN 210 selects Radio Priority and Packet Flow Id based on QoS Negotiated, and returns an Activate PDP Context Accept message to the cell phone 290, 390. The Activate PDP Context Accept message may e.g. comprise such information as the PDP Type, PDP Address, TI, QoS Negotiated, Radio Priority, Packet Flow Id, Protocol Configuration Options, BCM.

The above steps SA'1-SA'4 are well known to those skilled in the art and they are also thoroughly defined in the 3GPP standard; see e.g. the 3GPP specifications TS 23.060 and TS 29.060. Hence, the steps SA'1-SA'4 need no further description.

Update a Session in the $2^{nd}$ Exemplifying Network—SGSN to GGSN

Figure 9:
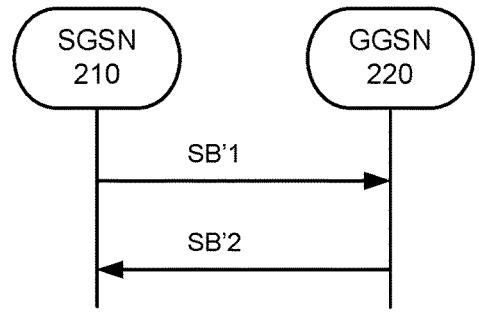
FIG. 9 is a schematic illustration of a seventh use-case.

FIG. 9 is an exemplifying use-case illustrating how a SGSN 210 or similar may initiate an update of the PDP context in the SGSN 210 and GGSN 220 of the GPRS network 200 shown in FIG. 2. For example, an update of the PDP context may be required if the QoS attributes becomes downgraded, which e.g. may happen if the air interface Um, Uu connecting the cell phone 290, 390 to the RAN 260, 360 becomes affected by interferences.

In a first step SB'1 in the use-case in FIG. 9, which may be the same or similar as the step SB1 described above, it is preferred that the SGSN 210 sends an Update PDP Context Request message to the GGSN 220 in question. The Update PDP Context Request message may e.g. comprise such information as the TEID, NSAPI, QoS Negotiated, Trace Reference, Trace Type, Trigger Id, OMC Identity, serving network identity, CGI/SAI/RAI change support indication, DTI.

In this connection it is particularly preferred—as is clearly provided for in e.g. the 3GPP specifications—that the Update PDP Context Request message comprises the information elements MS Time Zone (MTZ) and User Location Information (ULI) as briefly mentioned when describing the background of the invention above. In other words, it is preferred that the Update PDP Context Request message comprises information related to the position of the cell phone in question or similar.

In a second step SB'2, which may be the same or similar as the step SB2 described above, it is preferred that the GGSN 220 returns an Update PDP Context Response message to the SGSN 210. The Update PDP Context Response message may e.g. comprise such information as the TEID, QoS Negotiated, Prohibit Payload Compression, APN Restriction, Cause, CGI/SAI/RAI change report required.

The above steps SB'2-SB'2 are well known to those skilled in the art and they are also thoroughly defined in the 3GPP standard; see e.g. the 3GPP specifications TS 23.060 and TS 29.060. Hence, the steps SB'1-SB'2 need no further description.

To summarize, establishing a session as described above by sending a Create PDP Context Request message from the SGSN 210 to the GGSN 220 and updating the session as described above by sending an Update PDP Context Request message from the SGSN 210 to the GGSN 220 represent measures that are well known to those skilled in the art. Hence, it is well known that messages sent from the SGSN 210 to the GGSN 220 for establishing a session and messages sent from the SGSN 210 to the GGSN 220 for updating a session can comprise information related to the position of the cell phone 290, 390, in particular the information elements MS Time Zone (MTZ) and User Location Information (ULI).

However, as indicated earlier in the section describing the background of the invention, the messages Create PDP Context Request and Update PDP Context Request are sent for other reasons than changes in the information related to the position of the cell phone 290, 390 or similar. This should also be clear from the above more elaborated discussion of the two messages. Hence, the GGSN 220 will not always be updated with correct information with respect to the position of the cell phone 290, 390 or similar, since the two information elements MTZ and ULI are supplied to the GGSN 220 at times that are non-correlated to the time when the information elements MTZ and ULI change values. The chosen mechanism is further degraded as the two information elements are only transferred from the SGSN 210 to the GGSN 220 by an initiative taken by SGSN 210.

The below describes a more frequent updating of the GGSN 220 with respect to information that is related to the geographical position of a specific cell phone 290, 390 or similar. The updating is particularly advantageous since it has no or substantially no effect on the overall signaling frequency. In addition, the updating may be performed by initiative taken by the GGSN 220 itself.

Establishing a Session in the 2$^{nd}$ Exemplifying—PDN to GGSN to SGSN

Figure 10:
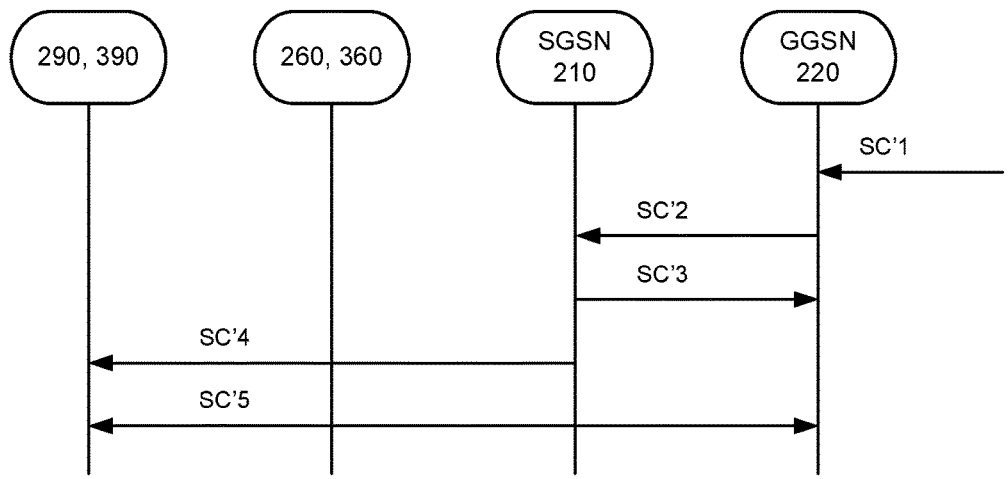
FIG. 10 is a schematic illustration of an eight use-case.

FIG. 10 is an exemplifying use-case illustrating how the GGSN 220—upon request from an external network as e.g. the PDN 250 in FIG. 2 or similar, or a node or a terminal or similar therein—may activate a PDP context in the SGSN 210 and GGSN 220 of the GPRS network 200 in FIG. 2. The activation of a PDP context can be perceived as a part of the establishing of a session between the external network 250 and the cell phone 290, 390 via the GPRS network 200.

In a first step SC'1 of the use-case in FIG. 10, which may be the same or similar as the step SC1 described above, it is preferred that the external network 250 or a node therein or similar transmits a PDP PDU (Packet Data Protocol, Protocol Data Unit) to the GGSN 220 via the GPRS Gi-interface, whereupon the GGSN 220 determines if the Network-Requested PDP Context Activation procedure has to be initiated.

In a second step SC'2, which may be the same or similar as the step SC2 described above, it is preferred that the GGSN 220 sends a PDU Notification Request message to the SGSN 210 in question. The PDU Notification Request message may e.g. comprise such information as the IMSI, PDP Type, PDP Address and the APN.

In a third step SC'3, which may be the same or similar as the step SC3 described above, it is preferred that the SGSN 210 returns a PDU Notification Response (Cause) message to the GGSN 220 in order to acknowledge that it shall request the cell phone 290, 390 or similar to activate the PDP context indicated with PDP Address.

In a fourth step SC'4, which may be the same or similar as the step SC4 described above, it is preferred that the SGSN 210 sends a Request PDP Context Activation message to request the cell phone 290, 390 or similar to activate the indicated PDP context. The Request PDP Context Activation message may e.g. comprise such information as the TI, PDP Type, PDP Address and the APN.

In a fifth step SC'5, which may be the same or similar as the step SC5 described above, it is preferred that the PDP context is activated with a PDP Context Activation procedure, e.g. the same or similar PDP Context Activation procedure as the one described above with reference to FIG. 3.

The above steps SC'1-SC'5 are well known to those skilled in the art and they are also thoroughly defined in the 3GPP standard; see e.g. the 3GPP specifications TS 23.060 and TS 29.060. Hence, the steps SC1-SC5 need no further description.

However, according to an embodiment of the present invention the PDU Notification Response message sent from the SGSN 210 to the GGSN 220 in step SC'3 above has been modified so as to comprise at least one and preferably both of the two information elements MS Time Zone (MTZ) and User Location Information (ULI), i.e. PDU Notification Response message has been provided with information related to the position of cell phone 290, 390. To this end it is preferred that the optional Private Extension part or similar of the PDU Notification Response message is provided with at least one of said MTZ or ULI or similar.

The above may be summarized in that the GGSN 220 can be provided with information related to the position of a cell phone 290, 390 or similar, which information is sent from the SGSN 210 in connection with the establishment of a session or similar, which establishing is initiated by the GGSN 220 upon request from an external network, e.g. such as the PDN 250 described above with reference to FIG. 2.

Update a Session in the 2$^{nd}$ Exemplifying Network—GGSN to SGSN

Figure 11:
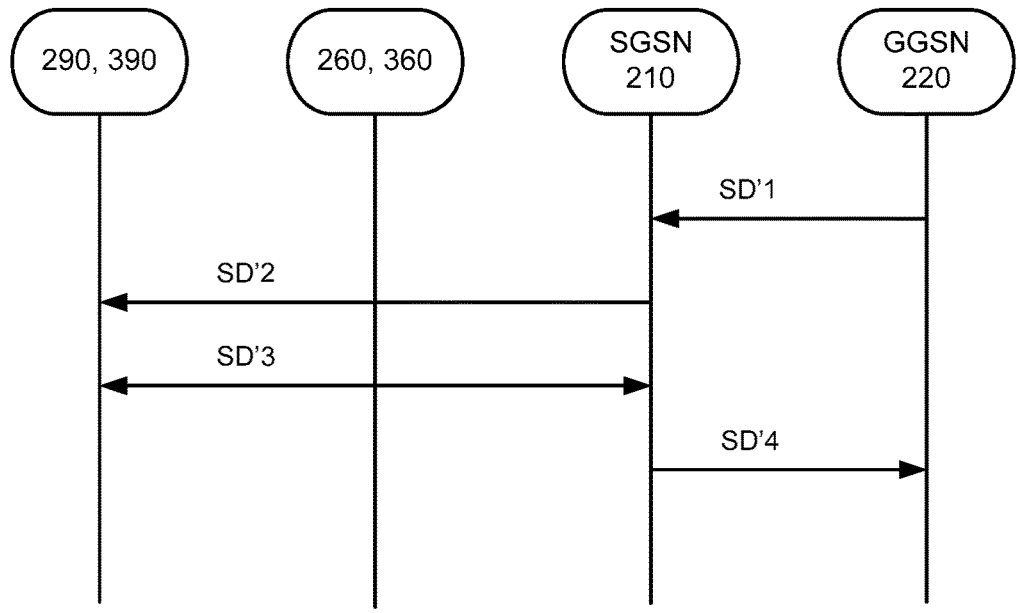
FIG. 11 is a schematic illustration of a ninth use-case.

FIG. 11 is an exemplifying use-case illustrating how a GGSN 220 or similar may initiate an update of a PDP context in the SGSN 210 and GGSN 220 of the GPRS network 200 in FIG. 2.

In a first step SD'1 of the use-case in FIG. 11, which may be the same or similar as the step SD1 described above, it is preferred that the GGSN 220 sends an Update PDP Context Request message to the SGSN 210 in question. The Update PDP Context Request message may e.g. comprise such information as the TEID, NSAPI, PDP Address, QoS Requested, Prohibit Payload Compression, APN Restriction, CGI/SAI/RAI change support required, TFT and BCM.

In a second step SD'2, which may be the same or similar as the step SD2 described above, it is preferred that the SGSN 210 sends a Modify PDP Context Request message to the cell phone 290, 390. The Modify PDP Context Request message may e.g. comprise such information as the TI, PDP Address, QoS Negotiated, Radio Priority, Packet Flow Id, TFT and BCM.

In a third step SD'3, which may be the same or similar as the step SD3 described above, it is preferred that the cell phone 290, 390 accepts the PDP context modification requested by the GGSN 220 and returns a Modify PDP Context Accept message to the SGSN 210 if the modification is successful.

In a fourth step SD'4, which may be the same or similar as the step SD4 described above, it is preferred that the SGSN 210 returns an Update PDP Context Response message to the GGSN 220. The update PDP Context Response message may e.g. comprise such information as the TEID and QoS Negotiated.

The above steps SD'1-SD'4 are well known to those skilled in the art and they are also thoroughly defined in the 3GPP standard; see e.g. the 3GPP specifications TS 23.060 and TS 29.060. Hence, the steps SD'1-SD'4 need no further description.

However, according to an embodiment of the present invention the Update PDP Context Response sent from the SGSN 210 to the GGSN 220 in step SD'4 above has been modified so as to be provided with at least one and preferably both of the two information elements MS Time Zone (MTZ) and User Location Information (ULI), i.e. PDU Notification Response message has been provided with information related to the position of cell phone 290, 390. To this end it is preferred that the optional Private Extension part or similar of the Update PDP Context Response message is provided with at least one of said MTZ or ULI or similar. It should be emphasized that step SD'4 may be performed before the steps SD'2 and SD'3.

The above may be summarized in that the GGSN 220 can be provided with information related to the position of a cell phone 290, 390 or similar, which information is sent from the SGSN 210 in connection with an update of a session, which update is initiated by the GGSN 220.

Deactivating a Session in the 2$^{nd}$ Exemplifying Network— GGSN to SGSN

Figure 12:
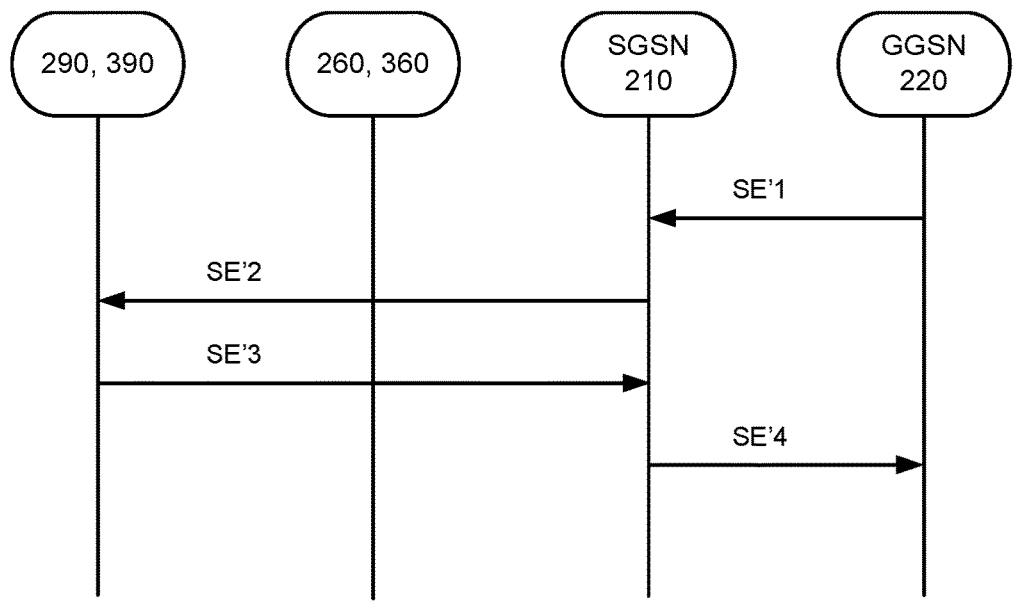
FIG. 12 is a schematic illustration of a tenth use-case.

FIG. 12 is an exemplifying use-case illustrating how a GGSN 220 or similar may initiate a deactivation of a PDP context in the SGSN 210 and the GGSN 220 of the GPRS network 200 shown in FIG. 2. Providing the GGSN 220 with information related to the position of a cell phone 290, 390 or similar when the PDP context is deactivated may seem irrelevant, since the PDP context is removed and the session may end. However, a cell phone 290, 390 or similar may have several PDP contexts activated simultaneously. It follows that the deactivation of a single PDP context does not necessary end all sessions between the cell phone 290, 390 and the GPRS network 200 in FIG. 2, since one or more PDP context may still be active. Hence, providing the GGSN 220 with information related to the position of a cell phone 290, 390 or similar when a PDP Context is removed it is a relevant scenario, at least when the cell phone 290, 390 keeps at least one active PDP Context after the requested deactivation is processed.

In a first step SE'1 of the use-case in FIG. 12, which may be the same or similar as the step SE1 described above, it is preferred that the GGSN 220 sends a Delete PDP Context Request message to the SGSN 210 in question. The Delete PDP Context Request message may e.g. comprise such information as e.g. the TEID, NSAPI and Teardown Ind. For example, the Teardown Ind information indicates whether or not all PDP contexts associated with this PDP address shall be deactivated.

In a second step SE'2, which may be the same or similar as the step SE2 described above, it is preferred that the SGSN 210 sends a Deactivate PDP Context Request message to the cell phone 290, 390. The Deactivate PDP Context Request message may e.g. comprise such information as the TI and Teardown Ind, Cause.

In a third step SE'3, which may be the same or similar as the step SE3 described above, it is preferred that the cell phone 290, 390 removes the PDP context and returns a Deactivate PDP Context Accept message to the SGSN 210.

In a fourth step SE'4, which may be the same or similar as the step SE4 described above, it is preferred that the SGSN 210 returns a Delete PDP Context Response message to the GGSN 210. The Delete PDP Context Response message may e.g. comprise such information as the TEID. The Delete PDP Context message is preferably sent over the backbone network of the GPRS network 200 in FIG. 2. The SGSN 210 may not wait for the response from the cell phone 290, 390 before sending the Delete PDP Context Response message to the GGSN 220.

The above steps SE'1-SE'4 are well known to those skilled in the art and they are also thoroughly defined in the 3GPP standard; see e.g. the 3GPP specifications TS 23.060 and TS 29.060. Hence, the steps SE1-SE4 need no further description.

However, according to an embodiment of the present invention the Delete PDP Context Response sent from the SGSN 210 to the GGSN 220 in step SE'4 above has been modified so as to comprise at least one and preferably both of the two information elements MS Time Zone (MTZ) and User Location Information (ULI), i.e. the Delete PDP Context Response has been provided with information related to the position of cell phone 290, 390. To this end it is preferred that the optional Private Extension part or similar of the Delete PDP Context Response message is provided with at least one of said MTZ or ULI or similar.

The above may be summarized in that the GGSN 220 can be provided with information related to the position of a cell phone 290, 390 or similar, which information is sent from the SGSN 210 in connection with the termination of a session, which termination is initiated by the GGSN 220.

It should be emphasized that the two nodes SGSN and GGSN mentioned above are mere examples of nodes that may be affected by the present invention. For example, more evolved networks, e.g. such as the 3GPP System Architecture Evolution (SAE), may have a Mobility Management Entity (MME) instead of or as a cooperating supplement to the above mentioned SGSN, and a User Plane Entity (UPE) instead of or as a cooperating supplement to the above mentioned GGSN.

The present invention has now been described with reference to exemplifying embodiments. However, the invention is not limited to the embodiments described herein. On the contrary, the full extent of the invention is only determined by the scope of the appended claims.

The invention claimed is:

1. A method in a serving GPRS support node (SGSN) for providing geographical-location information of a mobile terminal to a gateway GPRS support node (GGSN) within a communication network, said communication network including the SGSN, the GGSN, and an access network providing wireless access to the mobile terminal, the method comprising:

obtaining wireless access to said mobile terminal for said SGSN via a wireless interface provided by said access network;

connecting said SGSN with said GGSN wherein said GGSN has access to at least one external network;

sending a response from said SGSN to said GGSN, comprising:

an Update PDP Context Response message to the GGSN when receiving an Update PDP Context Request message from the GGSN; and a Delete PDP Context Response message to the GGSN when receiving a Delete PDP Context Request message from the GGSN; and wherein said response comprises information related to a geographical position of the mobile terminal in the form of at least one of Mobile Station Time Zone (MTZ) and User Location Information (ULI).

2. A serving GPRS support node (SGSN) for providing geographical-location information of a mobile terminal to a gateway GPRS support node (GGSN) within a communication network, said communication network including the SGSN, the GGSN, and an access network providing wireless access to the mobile terminal, the SGSN comprising:

processing circuitry configured to:

obtain wireless access to said mobile terminal for said SGSN via a wireless interface provided by said access network;

connect said SGSN with said GGSN has access to at least one external network;

means for sending send a session response from said SGSN to said GGSN, comprising:

an Update PDP Context Response message to the GGSN when receiving an Update PDP Context Request message from the GGSN; and a Delete PDP Context Response message to the GGSN when receiving a Delete PDP Context Request message from the GGSN; and wherein said response comprises information related to a geographical position of the mobile terminal in the form of at least one of Mobile Station Time Zone (MTZ) and User Location Information (ULI).

3. A method in a gateway GPRS support node (GGSN) for receiving geographical-location information of a mobile terminal from a serving GPRS support node (SGSN) within a communication network, said communication network including the GGSN, the SGSN, and an access network providing wireless access to the mobile terminal, the method comprising:

connecting said GGSN with said SGSN, wherein said GGSN has access to at least one external network;

receiving a response from said SGSN, comprising:

an Update PDP Context Response message when the GGSN sends an Update PDP Context Request message to the SGSN; and a Delete PDP Context Response message when the GGSN sends a Delete PDP Context Request message to the SGSN; and wherein the response comprises information related to a geographical position of the mobile terminal in the form of at least one of Mobile Station Time Zone (MTZ) and User Location Information (ULI).

4. A gateway GPRS support node (GGSN) for receiving geographical-location information of a mobile terminal from a serving GPRS support node (SGSN) within a communication network, said communication network including the GGSN, the SGSN, and an access network providing wireless access to the mobile terminal, the GGSN comprising:

processing circuitry configured to:

connect said GGSN with said SGSN, wherein said GGSN has access to at least one external network;

receive a response from said SGSN, comprising:

an Update PDP Context Response message when the GGSN sends an Update PDP Context Request message to the SGSN; and a Delete PDP Context Response message when the GGSN sends a Delete PDP Context Request message to the SGSN; and wherein the response comprises information related to a geographical position of the mobile terminal in the form of at least one of Mobile Station Time Zone (MTZ) and User Location Information (ULI).

\* \* \* \* \*

UNITED STATES PATENT AND TRADEMARK OFFICE
CERTIFICATE OF CORRECTION

PATENT NO. : 10,299,301 B2
APPLICATION NO. : 15/425023
DATED : May 21, 2019
INVENTOR(S) : Olsson et al.

It is certified that error appears in the above-identified patent and that said Letters Patent is hereby corrected as shown below:

In the Drawings

In Fig. 8, Sheet 5 of 6, delete "SA'1)" and insert -- SA'1 --, therefor.

In the Specification

In Column 1, Line 8, delete "2009," and insert -- 2009, now Pat. No. 9,602,958, --, therefor.

In Column 2, Line 2, delete "(GPRS)," and insert -- (GPRS); --, therefor.

In Column 2, Lines 26-27, delete "(Core Net)." and insert -- (Core Network). --, therefor.

In Column 2, Line 33, delete "(Core Net)." and insert -- (Core Network). --, therefor.

In Column 4, Line 40, delete "the a" and insert -- the --, therefor.

In Column 4, Line 56, delete "eight" and insert -- eighth --, therefor.

In Column 5, Line 7, delete "eight" and insert -- eighth --, therefor.

In Column 5, Line 17, delete "eight" and insert -- eighth --, therefor.

In Column 5, Line 27, delete "eight," and insert -- eighth, --, therefor.

In Column 5, Line 37, delete "eight," and insert -- eighth, --, therefor.

In Column 5, Line 61, delete "network" and insert -- network. --, therefor.

Signed and Sealed this
Twentieth Day of August, 2019

Andrei Iancu
*Director of the United States Patent and Trademark Office*

CERTIFICATE OF CORRECTION (continued)
U.S. Pat. No. 10,299,301 B2

In Column 5, Line 63, delete "network" and insert -- network. --, therefor.

In Column 6, Line 4, delete "eight" and insert -- eighth --, therefor.

In Column 6, Line 56, delete "an triangulation" and insert -- a triangulation --, therefor.

In Column 7, Line 44, delete "se e.g." and insert -- see e.g. --, therefor.

In Column 7, Line 59, delete "GSGSN" and insert -- GGSN --, therefor.

In Column 8, Line 52, delete "Node-α0" and insert -- Node-α --, therefor.

In Column 10, Line 63, delete "necessary" and insert -- necessarily --, therefor.

In Column 11, Line 47, delete "cell pone" and insert -- cell phone --, therefor.

In Column 14, Line 37, delete "SC1-SC5" and insert -- SC'1-SC'5 --, therefor.

In Column 15, Line 58, delete "necessary" and insert -- necessarily --, therefor.

In Column 16, Line 31, delete "SE1-SE4" and insert -- SE'1-SE'4 --, therefor.

In the Claims

In Column 17, Line 33, in Claim 2, delete "sending send a" and insert -- sending a --, therefor.